United States Patent
Stimpson et al.

(10) Patent No.: US 11,110,917 B2
(45) Date of Patent: Sep. 7, 2021

(54) METHOD AND APPARATUS FOR INTERACTION AWARE TRAFFIC SCENE PREDICTION

(71) Applicant: Great Wall Motor Company Limited, Baoding (CN)

(72) Inventors: Alexander Stimpson, West Bloomfield, MI (US); Sugandh Raj, Farmington Hills, MI (US)

(73) Assignee: Great Wall Motor Company Limited, Baoding (CN)

( * ) Notice: Subject to any disclaimer, the term of this patent is extended or adjusted under 35 U.S.C. 154(b) by 248 days.

(21) Appl. No.: 16/410,555

(22) Filed: May 13, 2019

(65) Prior Publication Data

US 2020/0361456 A1  Nov. 19, 2020

(51) Int. Cl.
*B60W 30/095* (2012.01)
*G05D 1/00* (2006.01)
*B60W 30/09* (2012.01)

(52) U.S. Cl.
CPC ........ *B60W 30/0956* (2013.01); *B60W 30/09* (2013.01); *G05D 1/0088* (2013.01); *G05D 2201/0213* (2013.01)

(58) Field of Classification Search
CPC .............. B60W 30/0956; B60W 30/09; G05D 1/0088; G05D 2201/0213
See application file for complete search history.

(56) References Cited

U.S. PATENT DOCUMENTS

| | | | | |
|---|---|---|---|---|
| 9,569,967 B2 * | 2/2017 | Petridis | ................ | B60W 50/14 |
| 9,975,550 B2 * | 5/2018 | Katoh | ............... | B60W 30/0956 |
| 9,977,430 B2 * | 5/2018 | Shalev-Shwartz | .......................... | G06K 9/00825 |
| 10,029,682 B2 | 7/2018 | Gunaratne | | |
| 2015/0202770 A1 * | 7/2015 | Patron | .................. | G06Q 20/386 700/245 |
| 2015/0284010 A1 * | 10/2015 | Beardsley | ................ | G08G 1/22 701/41 |
| 2017/0008521 A1 * | 1/2017 | Braunstein | ......... | G06K 9/00791 |

(Continued)

OTHER PUBLICATIONS

"How would surround vehicles move? A Unified Framework for Maneuver Classification and Motion Prediction." Deo, Nachiket et al., IEEE, Jan. 19, 2018. 12 pages.

(Continued)

*Primary Examiner* — Yazan A Soofi

(74) *Attorney, Agent, or Firm* — Young Basile Hanlon & MacFarlane, P.C.

(57) ABSTRACT

Methods and systems for decision making in an autonomous vehicle (AV) are described. A vehicle control system may include a control unit, a perception unit, and a behavioral planning unit. The behavioral planning unit may include an intent estimator that receives a first set of perception information from the perception unit. The behavioral planning unit may include a motion predictor that receives the first set of perception information from the perception unit. The behavioral planning unit may include a function approximator that receives a second set of perception information from the perception unit. The second set of perception information is smaller than the first set of perception information. The function approximator determines a prediction, and the control unit uses the prediction to control an operation of the AV.

18 Claims, 12 Drawing Sheets

(56) References Cited

U.S. PATENT DOCUMENTS

| | | | | |
|---|---|---|---|---|
| 2018/0342113 | A1* | 11/2018 | Kislovskiy | G08G 1/202 |
| 2019/0049958 | A1* | 2/2019 | Liu | G01S 17/89 |
| 2019/0113918 | A1* | 4/2019 | Englard | G05D 1/024 |
| 2019/0258251 | A1* | 8/2019 | Ditty | G05D 1/0274 |
| 2020/0277868 | A1* | 9/2020 | Hucker | F23R 3/06 |
| 2021/0056713 | A1* | 2/2021 | Rangesh | G06K 9/6267 |

OTHER PUBLICATIONS

"Multi-Modal Trajectory Prediction of Surrounding Vehicles with Maneuver based LSTMs." Deo, Nachiket et al. May 15, 2018. Six pages.

"Convolutional Social Pooling for Vehicle Trajectory Prediction." Deo, Nachiket et al. May 15, 2018. Nine pages.

"Intent Estimation and Motion Model Based Collision Avoidance Method for Autonomnous Vehiclels in Urban Environments." Huang, Rulin et al. Applied Sciences, 2017, 7, 457; DOI: 10.3390/APP7050457. 21 pages.

"Recognition, Prediction, and Planning for Assisted Teleoperation of Freeform Tasks." Hauser, Kris. School of Informatics and Computing, Indiana University at Bloomington. Eight pages.

"Using Context Information and Probabilistic Classification for Making Extended Long-Term Trajectory Predictions." Klinelschmitt, Stefan et al. 2015 IEEE 18th International Conference on Intelligent Transportation Systems. 2015 IEEE DOI 10.1109/ITSC.2015.120. 7 pages.

"Mixed Driver Intention Estimation and Path Prediction Using Vehicle Motion and Road Structure Information." Salomonson, Ivar et al. Thesis—Dec. 2015. Chalmers University of Technology. 69 pages.

"An Integrated Approach to Maneuver-Based Trajectory Prediction and Criticality Assessment in Arbitrary Road Environments." Schreier, Matthias et al. IEEE Transactions on Intelligent Transportation Systems, vol. 17, No. 10, Oct. 2016. 16 pages.

"Stacked Generalization." Wolpert, David H. Complex Systems Group, Theoretical Division, and Center for Non-Linear Studies, MS B213, LANL. 57 pages.

\* cited by examiner

METHOD AND APPARATUS FOR INTERACTION AWARE TRAFFIC SCENE PREDICTION

TECHNICAL FIELD

This disclosure relates to autonomous vehicles. More specifically, this disclosure relates to behavior planning and decision making methods for autonomous vehicles.

BACKGROUND

Autonomous vehicles (AV)s need to make decisions in dynamic, uncertain environments with tight coupling between the actions of all other actors involved in a driving scene, i.e. perform behavioral planning. A behavioral planning layer may be configured to determine a driving behavior based on perceived behavior of other actors, road conditions, and infrastructure signals.

For a collision-free path, it is important to estimate the future interactions of the traffic participants accurately and efficiently. Modern frameworks may be designed to tackle this problem in one of two ways: driver intent (maneuver) estimation or future motion prediction. Independent application of these methodologies may be applied to both pedestrian motion and vehicular motion, however, each technique only captures part of the information that drives how agents move in the environment.

Typical intent estimation and motion prediction models process the same input (i.e., track histories) and provide outputs in different formats. In other words, they are two ways to solve the same problem, hence the reason for individual models. Accordingly, it would be desirable to combine the outputs of the intent estimation and motion prediction models to predict the future motion of traffic participants.

SUMMARY

Disclosed herein are implementations of behavior planning and decision-making methods and systems. In an aspect, a vehicle control system for an autonomous vehicle (AV) may include a perception unit, a behavioral planning unit, and a control unit. The behavioral planning unit may include an intent estimator, a motion predictor, a function approximator, or any combination thereof. The intent estimator may be configured to receive a first set of perception information from the perception unit. The motion predictor may be configured to receive the first set of perception information from the perception unit. The function approximator may be configured to receive a second set of perception information from the perception unit. The second set of perception information may be smaller than the first set of perception information. The function approximator may be configured to determine a prediction. The control unit may be configured to use the prediction to control an operation of the AV.

In an aspect, a method for use in an AV may include receiving a first set of perception information at an intent estimator. The method may include receiving the first set of perception information at a motion predictor. The method may include receiving a second set of perception information at a function approximator. The second set of perception information may be smaller than the first set of perception information. The method may include determining a prediction. The method may include controlling an operation of the AV based on the prediction.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
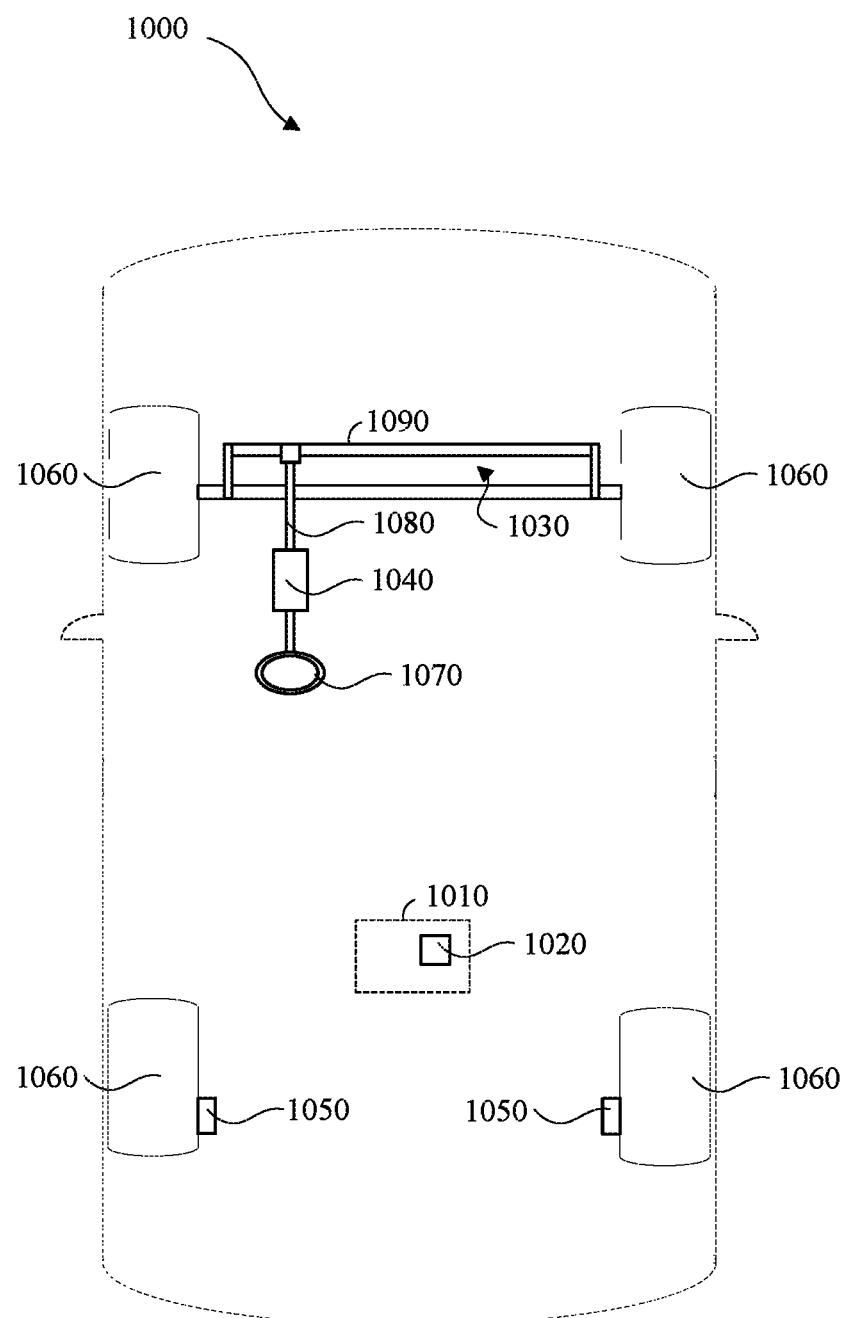
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

As autonomous vehicles (AV)s come into existence, it is imperative for the AVs to co-exist in an environment that includes multiple independently-acting traffic participants. For a collision-free path, each AV must estimate the future interactions of the traffic participants accurately and efficiently.

The embodiments disclosed herein include an architecture that is configured to intelligently combine multiple sources of information to predict the future motion of traffic participants. The framework for the architecture may be actor (i.e., traffic participant) agnostic. The framework may be tasked for trajectory predictions for all the traffic participants in a scene for a predetermined time in the future. The input to the framework may be a combination of a current perception of one or more actors of the traffic scene, the current localization state of the one or more actors, a future intent estimation of the one or more actors, a future motion prediction of the one or more actor, or any combination thereof. The current perception of an autonomous actor of the traffic scene may be based on sensor data, for example, cameras, RADARs, LiDARS, or any combination thereof. The current localization state of an autonomous actor may be based on information sources such as a global positioning system (GPS), inertial navigation system (INS), or both.

Intent estimation and motion prediction are scene prediction problems that may be solved using multiple methods. For example, in an intent estimation model, a machine learning (ML) model may be implemented. The ML model may obtain the history of states of all the traffic participants in a scene and output the respective intent (i.e., maneuver) of each traffic participant to be executed in the near future. For example, a set of maneuvers for a lane change scenario may include moving left, moving right, keeping the lane, maintaining speed, braking, or any combination thereof. Similarly, each road structure may have a discrete set of maneuvers, categorized by the type of traffic participant, for example, a vehicle, a cyclist, or a pedestrian. In a motion prediction model, an ML model may be implemented. For example, the ML model may obtain the same input as the intent estimation model, i.e., the past states of all the traffic participants, and learn the spatial and temporal interactions between all the actors (ego-vehicle-to-other actors and vice-versa) to output the respective future state of each of the traffic participants.

Interaction aware prediction is difficult to determine due to the numerous possibilities of the behaviors displayed by an agent, hence the problem can soon become intractable if not modeled properly. A function approximator may be implemented to obtain a final output where different sources of information are combined concurrently to account for multi-modality and in order to cover a larger spectrum of possibilities using a single framework. The function approximator may be configured to combine information in an intelligent manner. The combination may be performed using multiple methods, for example algebraic multiplication or addition, using ensemble techniques such as bagging, boosting, or the like, or any combination thereof. U.S. patent application Ser. No. 16/410,261 entitled "DECISION MAKING METHODS AND SYSTEMS FOR AUTOMATED VEHICLE", filed concurrently, is hereby incorporated by reference in its entirety.

FIG. 1 is a diagram of an example of a vehicle 1000 in accordance with embodiments of this disclosure. The vehicle 1000 may be an AV or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brakes 1050 applying a different braking force than the other brakes 1050.

The processor 1020 may be further programmed to command the brake system to apply a braking force, for example a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brakes 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is therefore less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
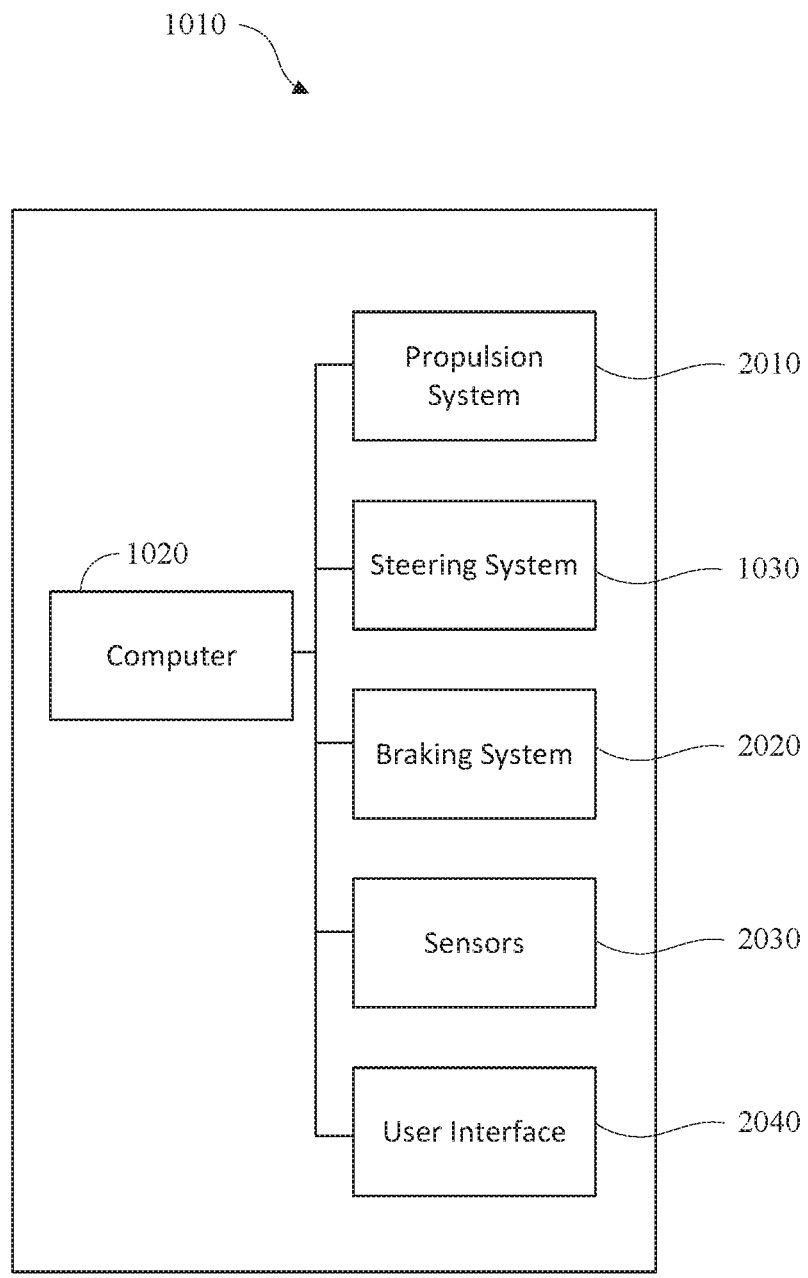
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by, one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning of the road wheels 1060. The steering column 1080 may be coupled to the steering rack 1090 via a rack-and-pinion, that is, gear meshing between a pinion gear and a rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, GPS sensors; accelerometers such as piezo-electric or microelectromechanical systems (MEMS); gyroscopes such as rate, ring laser, or fiber-optic gyroscopes; inertial measurements units (IMU); and magnetometers. The sensors 2030 may detect the external world, for example, radar sensors, scanning laser range finders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2V) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
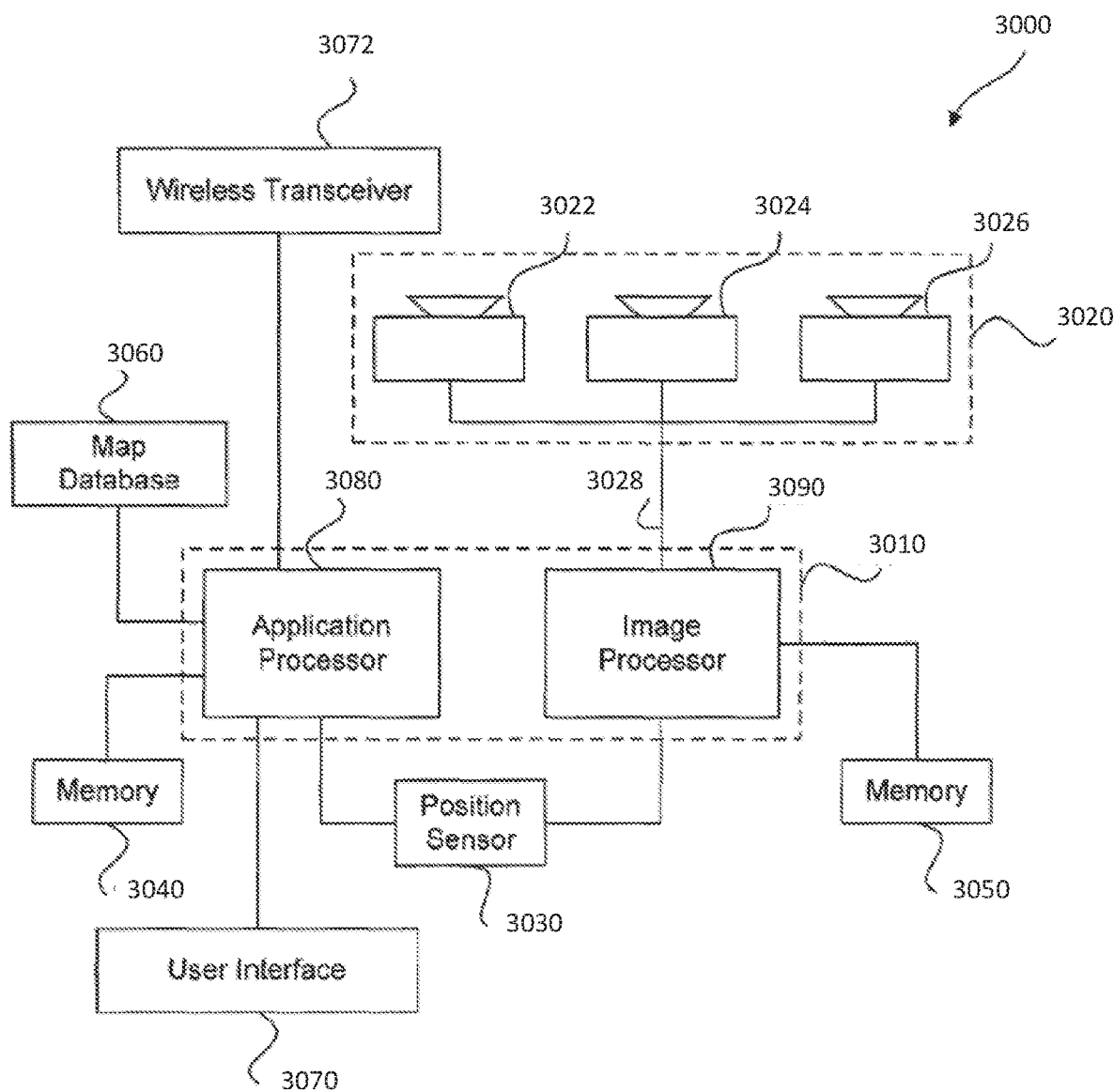
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, image capture device 3024, and image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 3 depicts two separate processing devices included in processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of vehicle control system 3000. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location.

User interface 3070 may include any device suitable for providing information to or for receiving inputs from one or more users of vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items, but also descriptors relating to those items, including, for example, names associated with any of the stored features. In some embodiments, map database 3060 may be physically located with other components of vehicle control system 3000. Alternatively or additionally, map database 3060 or a portion thereof may be located remotely with respect to other components of vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc.), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
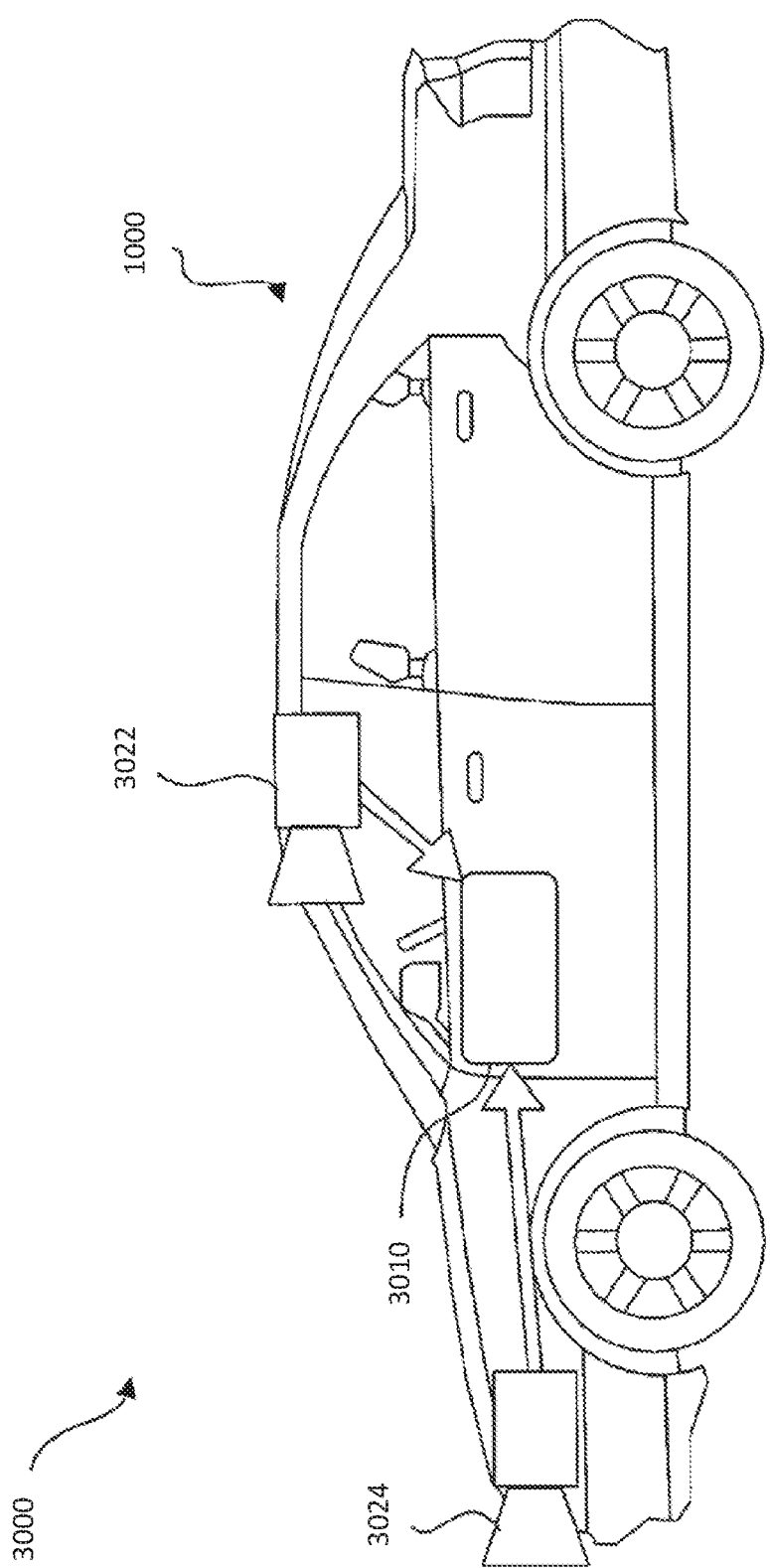
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an Advanced Driver Assistance Systems (ADAS) imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/or receive data over one or more networks (e.g., cellular networks, the Internet, etc.). For example, wireless transceiver 3072 may upload data collected by vehicle control system 3000 to one or more servers, and download data from the one or more servers. Via wireless transceiver 3072, vehicle control system 3000 may receive, for example, periodic or on demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by user via, for example, wireless transceiver 3072, be initialized by factory default settings, or by data received by wireless transceiver 3072.

Figure 5:
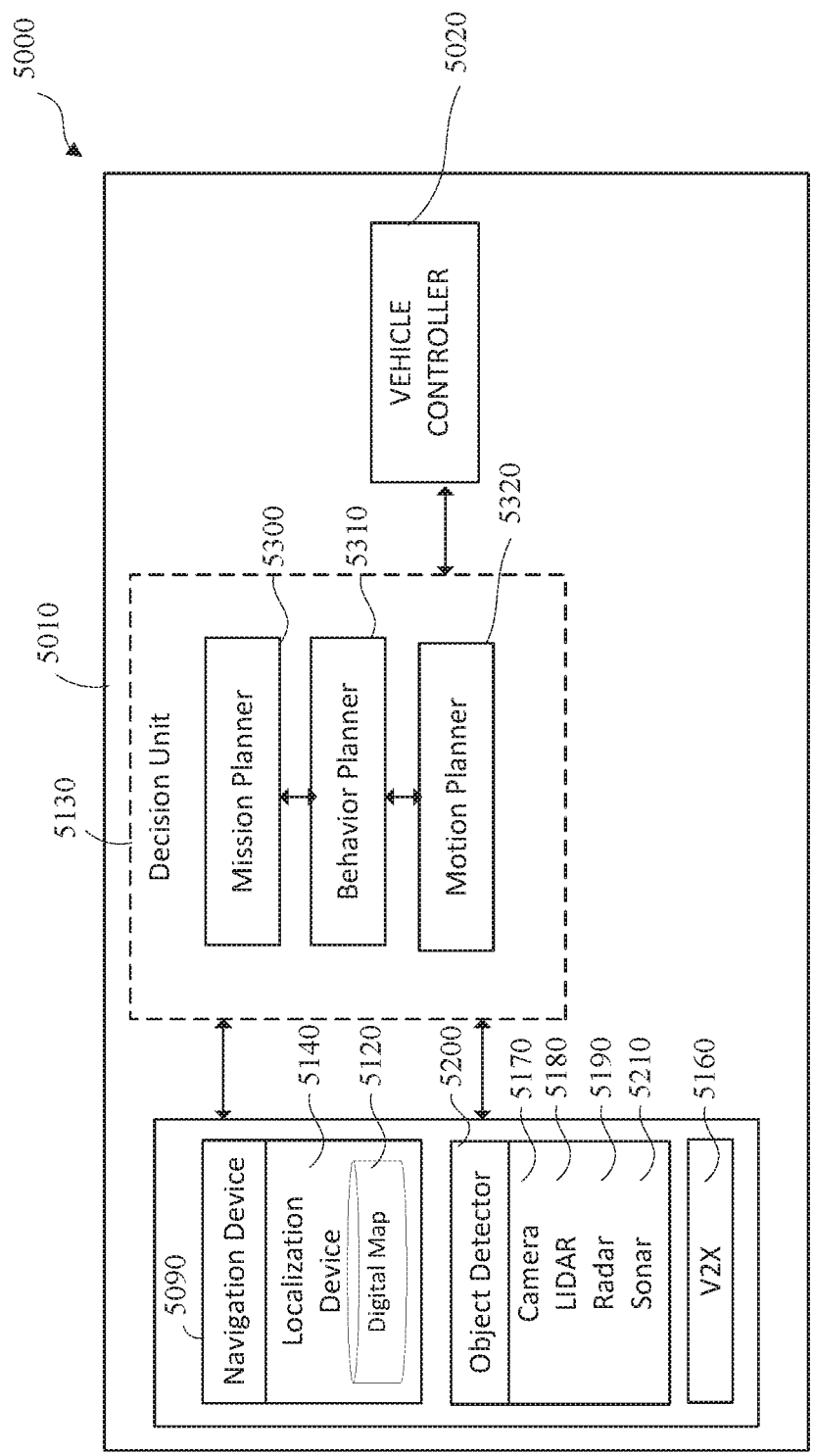
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010.

Referring to FIG. 5, the vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140, such as a GPS/GNSS receiver and an inertial measurement unit (IMU). A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part by way of V2I communications, V2V communications, vehicle-to-pedestrian (V2P) communications, or a combination thereof, which may generically be labeled as V2X communications 5160.

In some implementations, an object detector 5200 may include the sonar unit 5210, the camera 5170, the LIDAR unit 5180, and the radar unit 5190. The object detector 5200 may be used to detect the relative location of another entity, and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include one or more processors such as a microprocessor or other control circuitry such as analog circuitry, digital circuitry, or both, including an application specific integrated circuit (ASIC) for processing data. The decision unit 5130 may include a memory, including non-volatile memory, such as electrically erasable programmable read-only memory (EEPROM) for storing one or more routines, thresholds, captured data, or a combination thereof. The decision unit 5130 may include at least a mission planner 5300, behavior planner 5310 and motion planner 5320, which collectively determine or control route or path planning, local driving behavior and trajectory planning for the host vehicle 5010.

The vehicle system architecture 5000 includes a vehicle controller or trajectory tracker 5020 that is in communication with the decision unit 5130. The vehicle controller 5020 may execute a defined geometric path (which may be provided by the motion planner 5320 or the decision unit 5130) by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including non-volatile memory, such as electrically erasable programmable read-only memory (EEPROM) for storing one or more routines, thresholds, captured data, or a combination thereof.

The host vehicle 5010 may operate in automated mode where a human operator is not needed to operate the vehicle 5010. In the automated mode, the vehicle control system 5000 (using for example the vehicle controller 5020, the decision unit 5130, navigation device 5090, the object detector 5200 and the other described sensors and devices) autonomously controls the vehicle 5010. Alternatively, the host vehicle may operate in manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6:
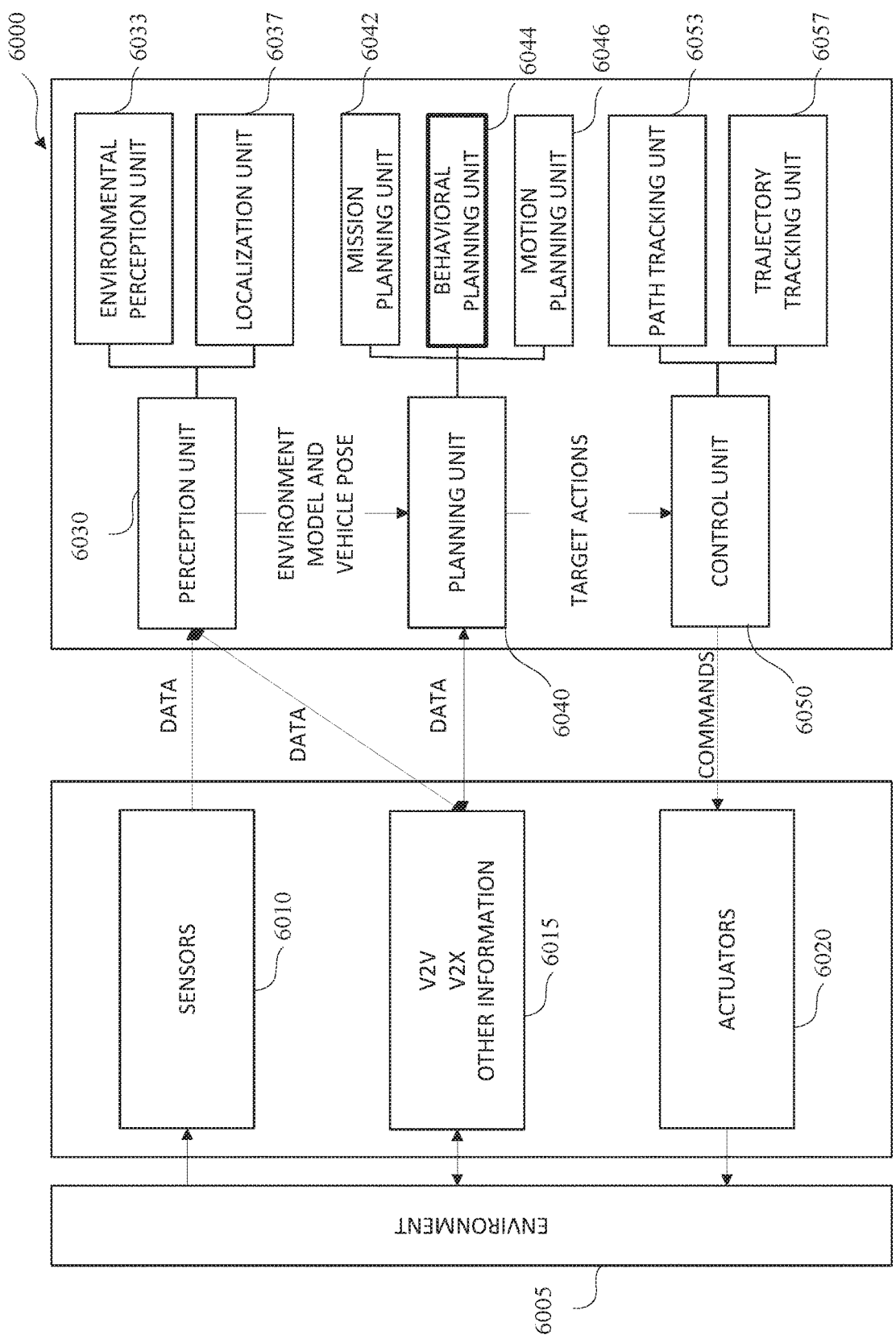
FIG. 6 is a diagram of an example of a vehicle control system in accordance with embodiments of this disclosure.

FIG. 6 is a diagram of an example of a vehicle control system 6000 in accordance with embodiments of this disclosure. The vehicle control system 6000 may include sensors 6010, and V2V, V2X and other like devices 6015 for gathering data regarding an environment 6005. The data may be used by a perception unit 6030 to extract relevant knowledge from the environment 6005, such as, but not limited to, an environment model and vehicle pose. The perception unit 6030 may include an environmental perception unit which may use the data to develop a contextual understanding of the environment 6005, such as, but not limited, where obstacles are located, detection of road signs/marking, and categorizing data by their semantic meaning. The perception unit 6030 may further include a localization unit which may be used by the AV to determine its position with respect to the environment 6005. A planning unit 6040 may use the data and output from the perception unit 6030 to make purposeful decisions in order to achieve the AV's higher order goals, which may bring the AV from a start location to a goal location while avoiding obstacles and optimizing over designed heuristics. The planning unit 6040 may include a mission planning unit or planner 6042, a behavioral planning unit or planner 6044, and a motion planning unit or planner 6046. The mission planning unit 6042, for example, may set a strategic goal for the AV, the behavioral planning unit 6044 may determine a driving behavior or vehicle goal state, and the motion planning unit 6046 may compute a trajectory. The perception unit 6030 and the planning unit 6040 may be implemented in the decision unit 5130 of FIG. 5, for example. A control unit or controller 6050 may execute the planned or target actions that have been generated by the higher-level processes, such as the planning unit 6040. The control unit 6050 may include a path tracking unit 6053 and a trajectory tracking unit 6057. The control unit 6050 may be implemented, by the vehicle controller 5020 shown in FIG. 5.

The behavioral planning unit 6044 may include a scene awareness data structure generator in communication with the perception unit 6030, the localization unit 6037, and the mission planning unit 6042. A driving scene and time history may be populated by the scene awareness data structure generator and may be used as inputs to a probabilistic explorer unit. The scene awareness data structure generator may determine a current driving scene state based on the environmental structure provided by the perception unit 6030, the vehicle position provided by the localization unit 6037, and a strategic-level goal provided by the mission planning unit 6042. The current driving scene state may be saved in the driving scene and time history, which may be implemented as a data structure in memory, for example.

Trajectory prediction may be performed using various methods. For example, trajectory prediction may be performed using a probabilistic combination of the outputs from intent estimation and motion prediction. In another example, trajectory prediction may be performed via serial processing of one of intent estimation or motion prediction followed by another intent estimation or motion prediction. The probabilistic combination may be performed by multiplying two or more probabilities. The intent estimation and motion prediction combination may use a single-layer stacking approach where the combination is performed through a weighting function.

The embodiments disclosed herein may implement one or more function approximators. A function approximator is a linear or non-linear ML model that is configured to learn the peculiarities of the underlying models. The function approximator may be configured to learn the peculiarities of any model. For example, in trajectory prediction, the function approximator may be configured to apply intent estimation models and motion prediction models. The function approximator may implement meta-modeling and combine multiple models to learn a new model, i.e. a second level model. The new model may outperform the single level learners due to its smoothening nature and its ability to highlight each base model that performs the best and discredit each base model that performs poorly. For example, depending on the model used for the function approximator, a new model may be learned explicitly, for example using linear regression, or a new model may be learned implicitly, for example using a neural network. The function approximator may be configured to determine whether a received prediction is correct. If the function approximator determines that the received prediction is incorrect, the function approximator may ignore the received prediction.

Figure 7B:
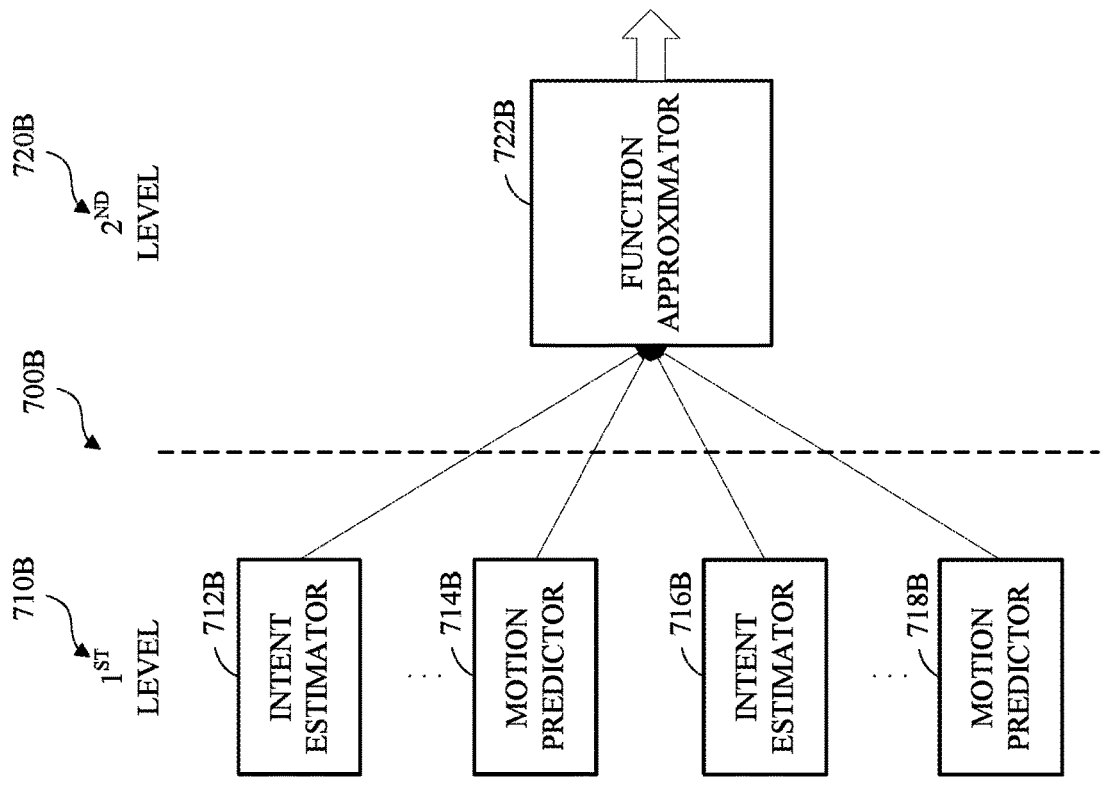
FIG. 7B is a diagram of an example of another example of a two-stage framework in accordance with embodiments of this disclosure.
Figure 7A:
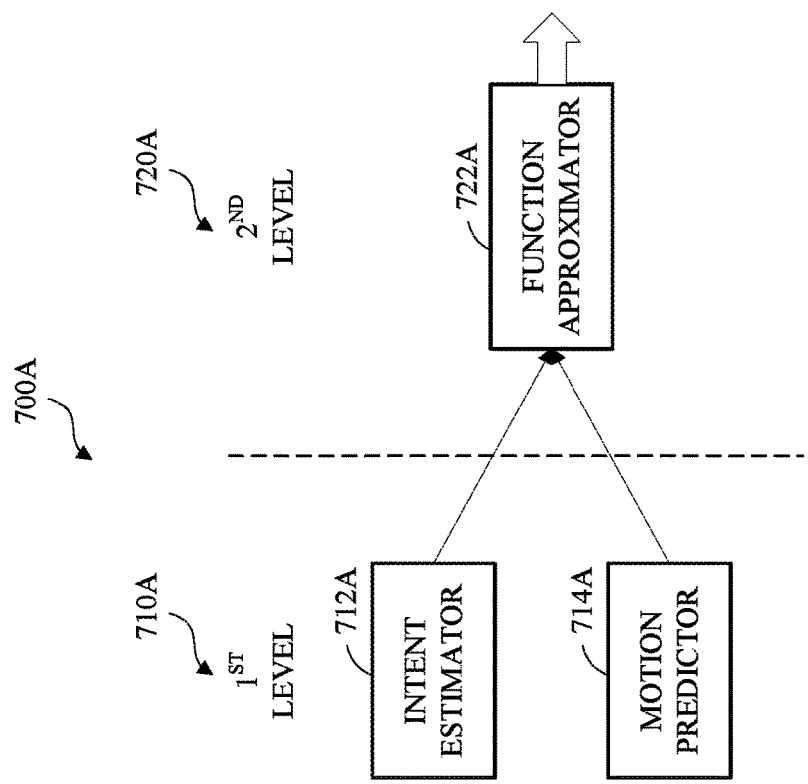
FIG. 7A is a diagram of an example of a two-stage framework in accordance with embodiments of this disclosure.

FIG. 7A is a diagram of an example of a two-stage framework 700A in accordance with embodiments of this disclosure. As shown in FIG. 7A, the two-stage framework 700A includes a first level 710A and a second level 720A. The first level 710A includes an intent estimator 712A and a motion predictor 714A. The second level 720A includes a function approximator 722A. The two-stage framework 700A may combine any learning model, for example using ensemble learning including Bayes Optimal Classifier, Bootstrap Aggregating, Boosting, Bayesian Parameter Averaging, Bayesian Model Combination, Bucket of Models, and Stacking. Example learning models may include, and are not limited to, a Linear Regressor, a Support Vector Machine, a K-Nearest Neighbor, or a Neural Network. For simplicity, the embodiments described herein are described with reference to an implementation using a stacking learning model, and it is understood that any learning model may be used. The stacking learning model may allow the overall system to learn in a local fashion such that the learning performance of the models is based on sample data, rather than overall performances. Accordingly, the stacking learning model may allow for a holistic understanding of the training data.

The stacking learning model may be referred to as meta-ensembling, and may be configured to combine two or more models to learn a new model. The training of the stacking learning model may include a normal mode and a restacking mode. The normal mode may include testing multiple models at a first level, storing the predictions of each model, training the next level models with these predictions as features, or any combination thereof. The restacking mode may include testing multiple models at a first level, storing the predictions of each model, training the next level models with the predictions from all the last levels, including the inputs at each level.

The intent estimator 712A may obtain a state history for each actor in a scene. Each state history may contain a position, velocity, an acceleration, a heading, any sensor data, or any combination thereof. The state history may be obtained through a sensor fusion technique from the perception unit. The intent estimator 712A may obtain the history of states of all the traffic participants in a scene and output the respective intent (i.e., maneuver) of each traffic participant to be executed in the near future. For example, a set of maneuvers for a lane change scenario may include moving left, moving right, keeping the lane, maintaining speed, braking, or any combination thereof. Similarly, each road structure may have a discrete set of maneuvers, categorized by the type of traffic participant, for example, a vehicle, a cyclist, or a pedestrian. A road structure may include a highway, a street road, an alley, a cul-de-sac, a driveway, a parking lot, a parking space, or any space or structure that may be traversed by a vehicle. The motion predictor 714A may obtain the same input as the intent estimator 712A, i.e., the past states of all the traffic participants, and learn the spatial and temporal interactions between all the actors (ego-vehicle-to-other actors and vice-versa) to output the respective future state of each of the traffic participants. In this example, the intent estimator 712A and the motion predictor 714A may obtain the same input and generate different outputs. The outputs may be referred to as predictions.

The function approximator 722A receives the output from the intent estimator 712A and the output from the motion predictor 714A. The function approximator 722A may be configured to concurrently combine the outputs to account for multi-modality and to cover a larger spectrum of possibilities using a single framework. The function approximator 722A may be configured to combine the outputs from the intent estimator 712A and the motion predictor 714A in an intelligent manner, for example using voting methods, algebraic multiplication or addition methods, using ensemble techniques such as bagging, boosting, stacking, or the like, or any combination thereof, and determine one or more predictions based on the combination. The function approximator 722A may be configured to transmit the one or more predictions to a control unit, for example control unit 6050 shown in FIG. 6. The function approximator 722A may use a stored prediction of a model to determine whether a received prediction is correct. If it is determined that the received prediction is not correct, the function approximator 722A may be configured to ignore the prediction, assign the prediction a low weight, or discredit or devalue the model from which the incorrect prediction was received.

FIG. 7B is a diagram of another example of a two-stage framework 700B in accordance with embodiments of this disclosure. FIG. 7B is an extension of the two-stage framework 700A shown in FIG. 7A of a stacking model where multiple intent estimators and motion predictors may be implemented at the first level. As shown in FIG. 7B, the two-stage framework 700B includes a first level 710B and a second level 720B. The first level 710B includes a first intent estimator 712B, a first motion predictor 714B, a second intent estimator 716B, and a second motion predictor 718B. For simplicity, only two intent estimators and two motion predictors are shown, and it is understood that any number of intent estimators and motion predictors may be implemented at the first level 710B. The second level 720B includes a function approximator 722B. The two-stage framework 700B may combine any learning model, for example using ensemble learning including Bayes Optimal Classifier, Bootstrap Aggregating, Boosting, Bayesian Parameter Averaging, Bayesian Model Combination, Bucket of Models, and Stacking. Example learning models may include, and are not limited to, a Linear Regressor, a Support Vector Machine, a K-Nearest Neighbor, or a Neural Network. For simplicity, the embodiments described herein are described with reference to an implementation using a stacking learning model, and it is understood that any learning model may be used. The stacking learning model may allow the overall system to learn in a local fashion such that the learning performance of the models is based on sample data, rather than overall performances. Accordingly, the stacking learning model may allow for a holistic understanding of the training data.

The stacking learning model may be configured to combine two or more models to learn a new model. The training of the stacking learning model may include a normal mode and a restacking mode. The normal mode may include testing multiple models at a first level, storing the predictions of each model, training the next level models with these predictions as features, or any combination thereof. The restacking mode may include testing multiple models at a first level, storing the predictions of each model, training the next level models with the predictions from all the last levels, including the inputs at each level.

Referring to FIG. 7B, the first intent estimator 712B and the second intent estimator 716B may obtain a state history for each actor in a scene. The state history input to the first intent estimator 712B and the second intent estimator 716B may be the same input or different inputs. The underlying algorithms for the first intent estimator 712B and the second intent estimator 716B may be the same or different. The first intent estimator 712B and the second intent estimator 716B may obtain the history of states of all the traffic participants in a scene and output the respective intent (i.e., maneuver) of each traffic participant to be executed in the near future. For example, a set of maneuvers for a lane change scenario may include moving left, moving right, keeping the lane, maintaining speed, braking, or any combination thereof. Similarly, each road structure may have a discrete set of maneuvers, categorized by the type of traffic participant, for example, a vehicle, a cyclist, or a pedestrian. The first motion predictor 714B and the second motion predictor 718B may respectively obtain the same input as the first intent estimator 712B and the second intent estimator 716B, i.e., the past states of all the traffic participants, and learn the spatial and temporal interactions between all the actors (ego-vehicle-to-other actors and vice-versa) to output the respective future state of each of the traffic participants. In this example, the first intent estimator 712B, the second intent estimator 716B, the first motion predictor 714B, and the second motion predictor 718B may obtain the same input and generate different outputs. The outputs may be referred to as predictions.

The function approximator 722B receives the output from the first intent estimator 712B, the output from the first motion predictor 714B, the output from the second intent estimator 716B, and the output from the second motion predictor 718B. The function approximator 722B may be configured to concurrently combine the outputs to account for multi-modality and to cover a larger spectrum of possibilities using a single framework. The function approximator 722B may be configured to combine the outputs from the first intent estimator 712B, the first motion predictor 714B, the second intent estimator 716B, and the second motion predictor 718B in an intelligent manner, for example using voting methods, algebraic multiplication or addition methods, using ensemble techniques such as bagging, boosting, stacking, or the like, or any combination thereof, and determine one or more predictions based on the combination. The function approximator 722B may be configured to transmit the one or more predictions to a control unit, for example control unit 6050 shown in FIG. 6. The function approximator 722B may use a stored prediction of a model to determine whether a received prediction is correct. If it is determined that the received prediction is not correct, the function approximator 722B may be configured to ignore the prediction, assign the prediction a low weight, or discredit or devalue the model from which the incorrect prediction was received.

Figure 7C:
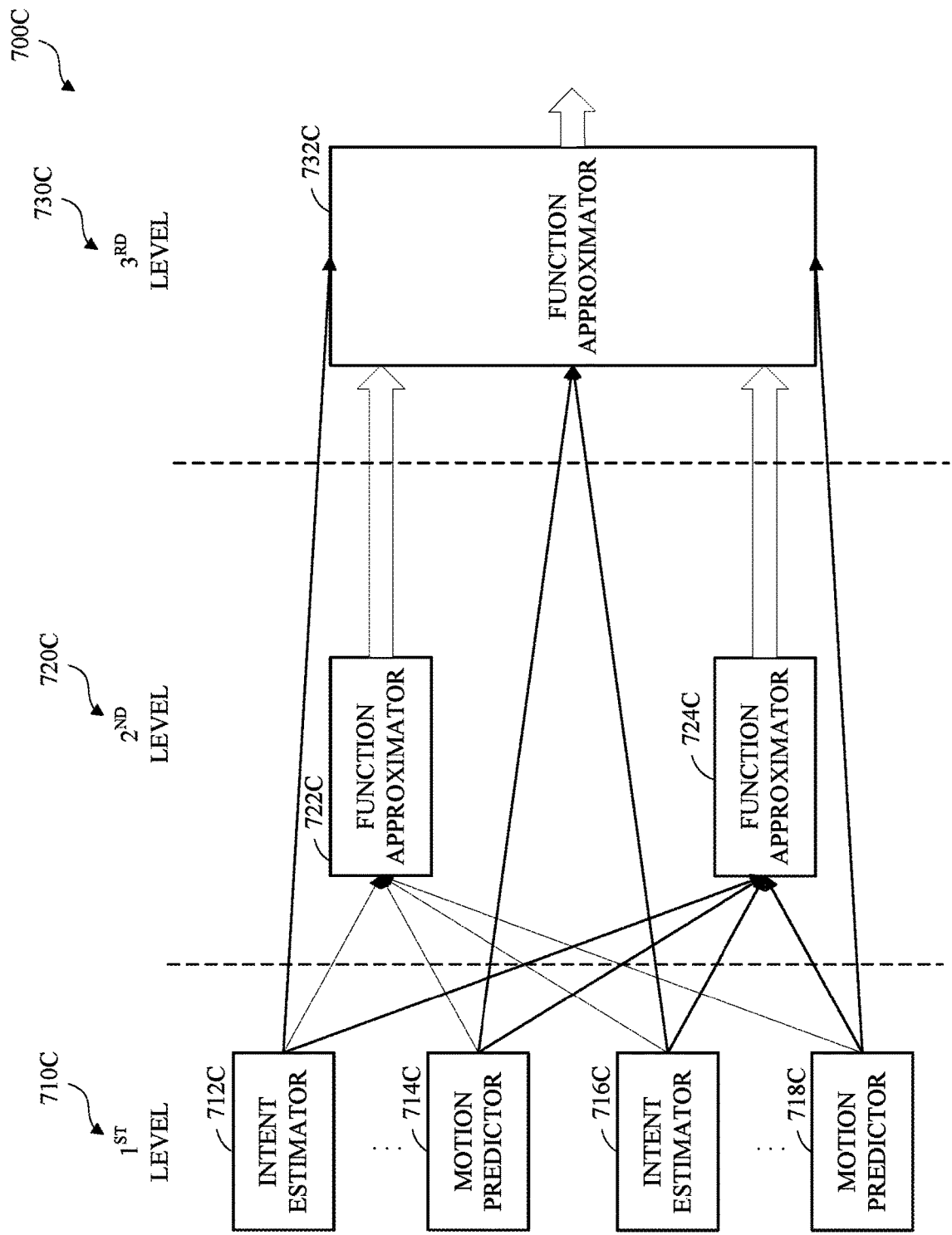
FIG. 7C is a diagram of an example of a three-stage framework in accordance with embodiments of this disclosure.

FIG. 7C is a diagram of an example of a three-stage framework 700C in accordance with embodiments of this disclosure. FIG. 7C is an extension of the two-stage framework 700B shown in FIG. 7B of a three-stage restacking mode stacking model. As shown in FIG. 7C, the three-stage framework 700C includes a first level 710C, a second level 720C, and a third level 730C. The first level 710C includes a first intent estimator 712C, a first motion predictor 714C, a second intent estimator 716C, and a second motion predictor 718C. For simplicity, only two intent estimators and two motion predictors are shown, and it is understood that any number of intent estimators and motion predictors may be implemented at the first level 710C. The second level 720B includes a first function approximator 722C and a second function approximator 724C. For simplicity, only two function approximators are shown, and it is understood that any number of function approximators may be implemented at the second level 720C. The third level 730C includes a function approximator 732C. For simplicity, only one function approximator is shown, and it is understood that certain implementations may include multiple function approximators at the third level 730C. The three-stage framework 700C may implement any learning model, for example ensemble learning including Bayes Optimal Classifier, Bootstrap Aggregating, Boosting, Bayesian Parameter Averaging, Bayesian Model Combination, Bucket of Models, and Stacking. For simplicity, the embodiments described herein are described with reference to an implementation using a stacking learning model, and it is understood that any learning model may be used. The stacking learning model may allow the overall system to learn in a local fashion such that the learning performance of the models is based on sample data, rather than overall performances. Accordingly, the stacking learning model may allow for a holistic understanding of the training data.

The stacking learning model may be configured to combine two or more models to learn a new model. The training of the stacking learning model may include a normal mode and a restacking mode. The normal mode may include testing multiple models at a first level, storing the predictions of each model, training the next level models with these predictions as features, or any combination thereof. The restacking mode may include testing multiple models at a first level, storing the predictions of each model, training the next level models with the predictions from all the last levels, including the inputs at each level.

Referring to FIG. 7C, the first intent estimator 712C and the second intent estimator 716C may obtain a state history for each actor in a scene. The state history input to the first intent estimator 712C and the second intent estimator 716C may be the same input or different inputs. The underlying algorithms for the first intent estimator 712C and the second intent estimator 716C may be the same or different. The first intent estimator 712C and the second intent estimator 716C may obtain the history of states of all the traffic participants in a scene and output the respective intent (i.e., maneuver) of each traffic participant to be executed in the near future. For example, a set of maneuvers for a lane change scenario may include moving left, moving right, keeping the lane, maintaining speed, braking, or any combination thereof. Similarly, each road structure may have a discrete set of maneuvers, categorized by the type of traffic participant, for example, a vehicle, a cyclist, or a pedestrian. The first motion predictor 714C and the second motion predictor 718C may respectively obtain the same input as the first intent estimator 712C and the second intent estimator 716C, i.e., the past states of all the traffic participants, and learn the spatial and temporal interactions between all the actors (ego-vehicle-to-other actors and vice-versa) to output the respective future state of each of the traffic participants. In this example, the first intent estimator 712C, the second intent estimator 716C, the first motion predictor 714C, and the second motion predictor 718C may obtain the same input and generate different outputs. The outputs may be referred to as predictions.

The first function approximator 722C and the second function approximator 724C receive the output from the first intent estimator 712C, the output from the first motion predictor 714C, the output from the second intent estimator 716C, and the output from the second motion predictor 718C. The first function approximator 722C and the second function approximator 724C may each be configured to concurrently combine the respective outputs to account for multi-modality and to cover a larger spectrum of possibilities using a single framework. The first function approximator 722C and the second function approximator 724C may each be configured to combine the respective outputs from the first intent estimator 712C, the first motion predictor 714C, the second intent estimator 716C, and the second motion predictor 718C in an intelligent manner, for example using voting methods, algebraic multiplication or addition methods, using ensemble techniques such as bagging, boosting, stacking, or the like, or any combination thereof, and determine one or more predictions based on the combination. The first function approximator 722C and the second function approximator 724C may each be configured to transmit the one or more predictions to the function approximator 732C at the third level 730C. The first function approximator 722C and the second function approximator 724C may each use a stored prediction of a model to determine whether a received prediction is correct. If it is determined that the received prediction is not correct, the first function approximator 722C and the second function approximator 724C may each be configured to ignore the prediction, assign the prediction a low weight, or discredit or devalue the model from which the incorrect prediction was received.

The function approximator 732C is configured to receive the output from the first intent estimator 712C, the output from the first motion predictor 714C, the output from the second intent estimator 716C, the output from the second motion predictor 718C, the output from the first function approximator 722C, and the output from the second function approximator 724C. The function approximator 732C may be configured to concurrently combine the outputs to account for multi-modality and to cover a larger spectrum of possibilities using a single framework. The function approximator 732C may be configured to combine the outputs from the first intent estimator 712C, the first motion predictor 714C, the second intent estimator 716C, the second motion predictor 718C, the first function approximator 722C, and the second function approximator 724C in an intelligent manner, for example using voting methods, algebraic multiplication or addition methods, using ensemble techniques such as bagging, boosting, stacking, or the like, or any combination thereof, and determine one or more predictions based on the combination. The function approximator 732C may be configured to transmit the one or more predictions to a control unit, for example control unit 6050 shown in FIG. 6. The function approximator 732C may use a stored prediction of a model to determine whether a received prediction is correct. If it is determined that the received prediction is not correct, the function approximator 732C may be configured to ignore the prediction, assign the prediction a low weight, or discredit or devalue the model from which the incorrect prediction was received.

Figure 8:
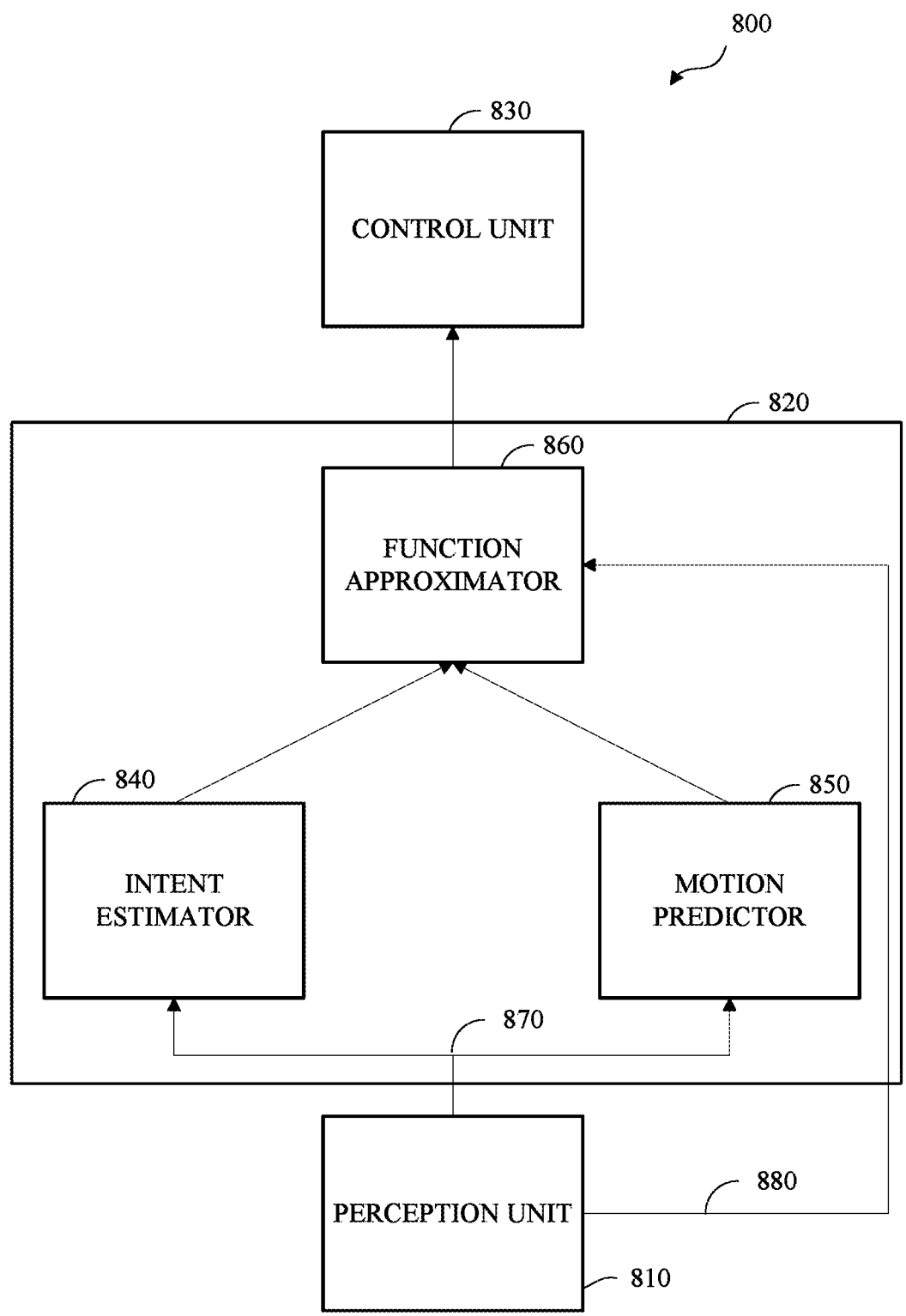
FIG. 8 is a diagram of an example of an example framework in accordance with embodiments of this disclosure.

FIG. 8 is a diagram of an example framework 800 in accordance with embodiments of this disclosure. As shown in FIG. 8, the framework 800 includes a perception unit 810, a behavioral planning unit 820, and a control unit 830. An example of the perception unit 810 may include the perception unit 6030 as shown in FIG. 6. An example of the behavioral planning unit 820 may include the behavioral planning unit 6044 as shown in FIG. 6. An example of the control unit 830 may include the control unit 6050 as shown in FIG. 6.

The behavioral planning unit 820 includes an intent estimator 840, a motion predictor 850, and a function approximator 860. An example of the intent estimator 840 may include any of the intent estimators 712A, 712B, 716B, 712C, 716C shown in FIGS. 7A-7C, respectively. An example of the motion predictor 850 may include any of the motion predictors 714A, 714B, 718B, 714C, 718C shown in FIGS. 7A-7C. An example of the function approximator 860 may include any of the function approximators 722A, 722B, 722C, 724C, 732C shown in FIGS. 7A-7C. The behavioral planning unit 820 is shown to have a two-stage framework for simplicity, and it is understood that any number of stages may be implemented.

Referring to FIG. 8, the perception unit 810 may send perception information, for example sensor data, to both the first layer of the prediction models and also to all the function approximators as further stages. As shown in FIG. 8, the perception unit 810 is configured to send a first set of perception information 870 to the intent estimator 840 and the motion predictor 850, and send a second set of perception information 880 to the function approximator 860. In this example, the first set of perception information 870 may be larger than the second set of perception information 880. In an example, the second set of perception information 880 may be a subset of the first set of perception information 870. In an example, the second set of perception information 880 may include information that is not included in the first set of perception information 870. The size and structure of the first set of perception information 870 and the second set of perception information 880 may be fixed, variable, or customizable. The second set of perception information 880 may be a learned set of correlations, derivations, or the like. The second set of perception information 880 may provide the function approximator 860 with some context of the observed scene.

Figure 9:
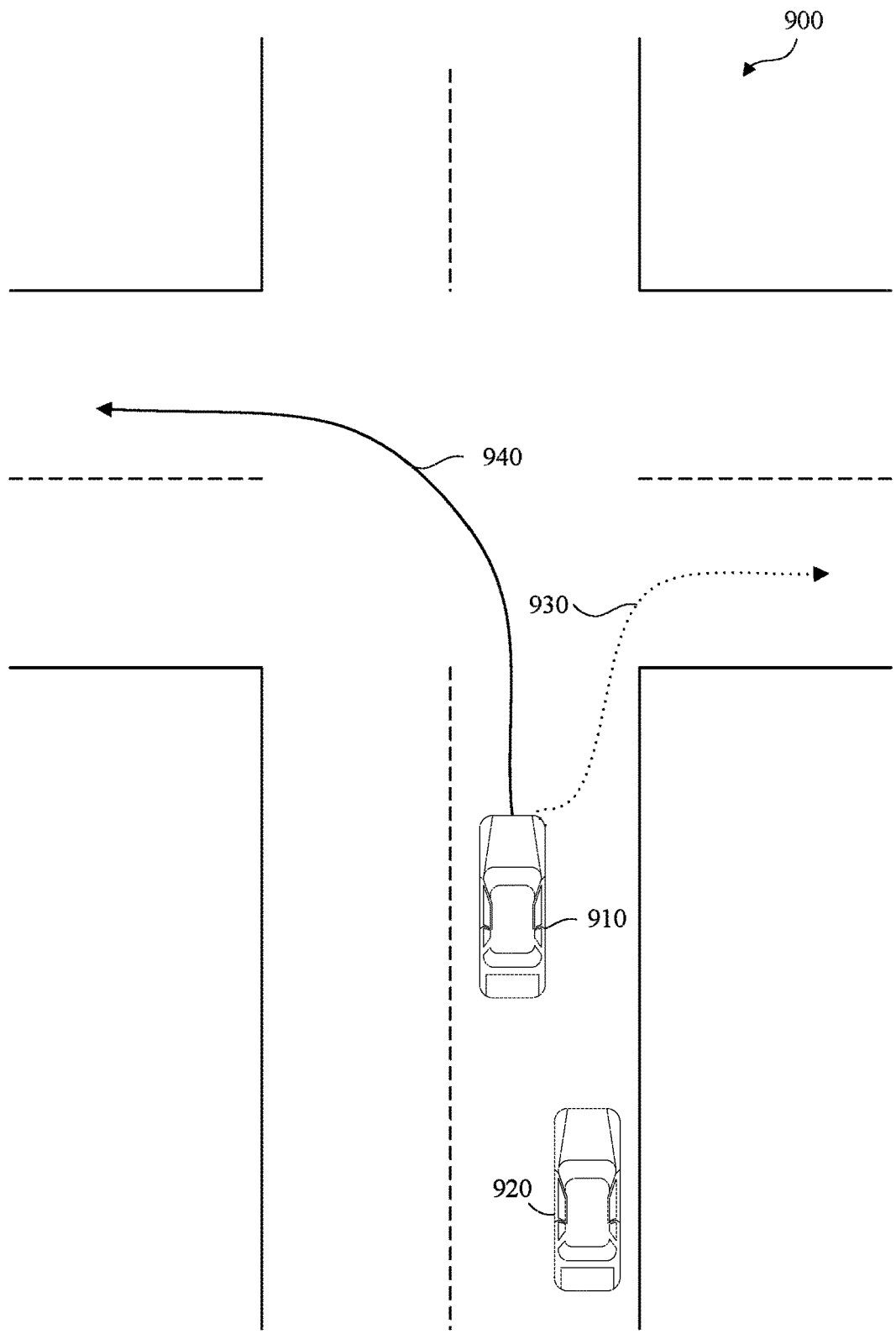
FIG. 9 is a diagram of an example of a use case for approaching an intersection that implements embodiments of this disclosure.

FIG. 9 is a diagram of an example of a use case for approaching an intersection 900 that implements embodiments of this disclosure. As shown in FIG. 9, a first vehicle 910 and a second vehicle 920 are approaching the intersection 900. In this scenario, the second vehicle 920 may request its behavioral planning unit to understand the behavior of the first vehicle 910. One or more function approximators of the behavioral planning unit of the second vehicle 920 may obtain the output from one or more intention estimators and one or more motion predictors as input. In this example, the output from the one or more intention estimators are shown as intention estimation 930 (shown in stippling) indicating that the first vehicle 910 will make a right lane change and turn right at the intersection 900. In this example, the output from the one or more motion predictors are shown as motion prediction 940 indicating that the first vehicle 910 will make a left turn at the intersection 900. In this example, the function approximator of the second vehicle 920 may be configured to determine the outputs based on its own training models, where the function approximator learned the performance of the individual prediction models based on a multitude of test scenarios. Due to this learning process, the function approximator may determine a more accurate and intelligent decision, even if the models output contrasting predictions.

Figure 10:
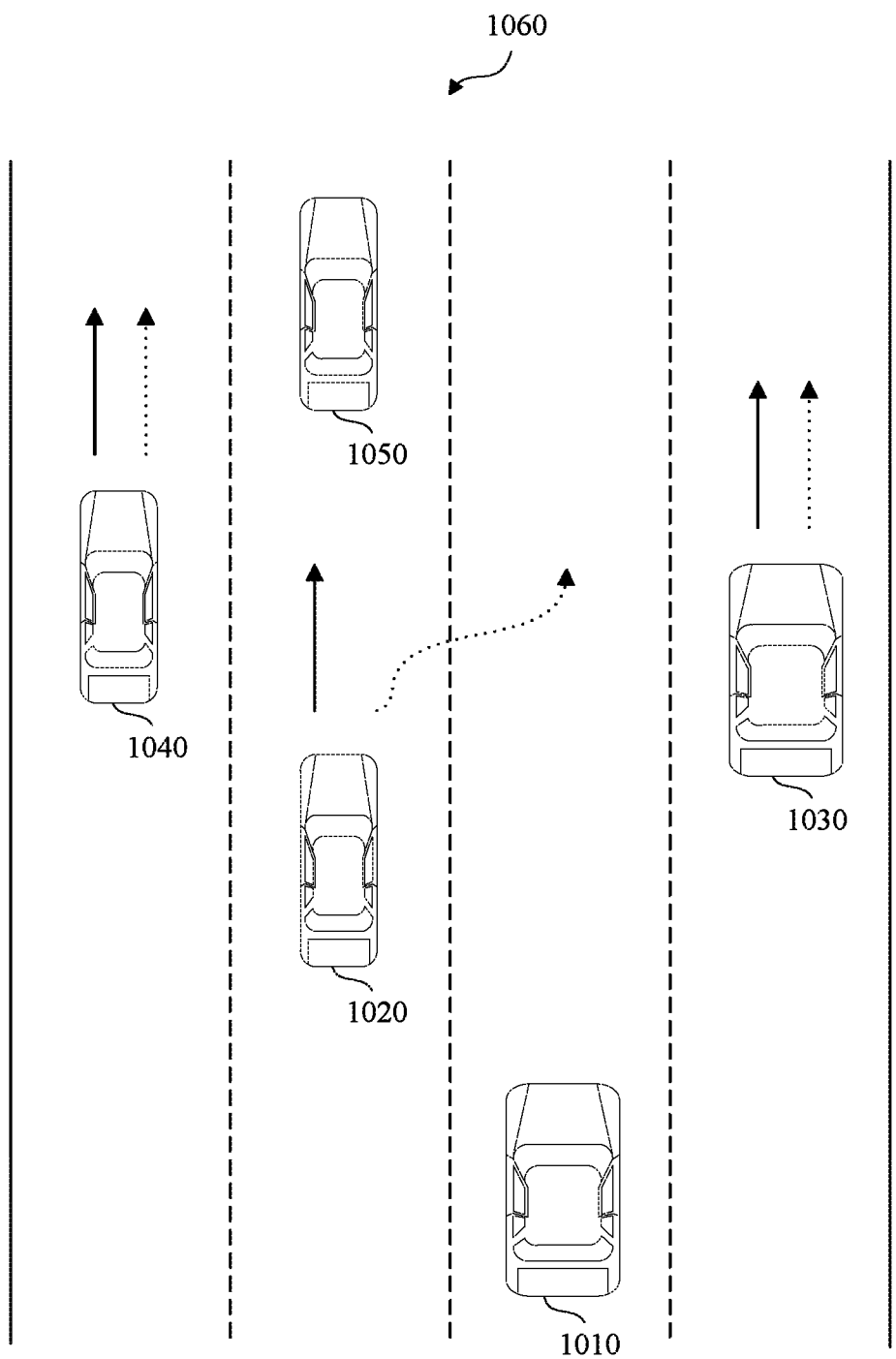
FIG. 10 is a diagram of an example of an example of a use case for a highway scenario.

FIG. 10 is a diagram of an example of a use case for a highway scenario. As shown in FIG. 10, a first vehicle 1010, a second vehicle 1020, a third vehicle 1030, a fourth vehicle 1040, and a fifth vehicle 1050 are shown traveling on a four-lane highway 1060 is shown. In this example, the first vehicle 1010 and the third vehicle 1030 may be larger vehicles, for example sport utility vehicles (SUV)s, whereas the second vehicle 1020, the fourth vehicle 1040, and the fifth vehicle 1050 may be smaller vehicles, for example sedans.

In this example, the first vehicle 1010 may be configured to request its behavioral planning unit to understand the behavior of the second vehicle 1020, the third vehicle 1030, the fourth vehicle 1040, and the fifth vehicle 1050. The solid arrows shown in FIG. 10 indicate the motion prediction of each vehicle as determined by the motion predictor of the first vehicle 1010, whereas the stippled arrows indicate the intention estimation of each vehicle as determined by the intent estimator of the first vehicle 1010. The function approximator of the first vehicle may be configured to receive the motion prediction and the intent estimation of each vehicle in the scene. The function approximator of the first vehicle 1010 may determine the behavior of each of the other vehicles in the scene based on the respective motion prediction and intent estimation. In addition, the first vehicle 1010 may include a higher-level meta-model that has observed each of the underlying models performing on various scenes. The performance results of the underlying models may be stored for each of the various scenes. Based on the stored performance results, the function approximator may be able to determine a better decision based on the particular circumstances. Another advantage of the proposed framework is that a smaller set of perception information may be sent to the function approximator. This smaller set of perception information may provide information related to the number of vehicles in the scene, the number of lanes in the scene, the size of the vehicles in the scene, or any combination thereof, and ultimately benefit in an improved decision.

Figure 11:
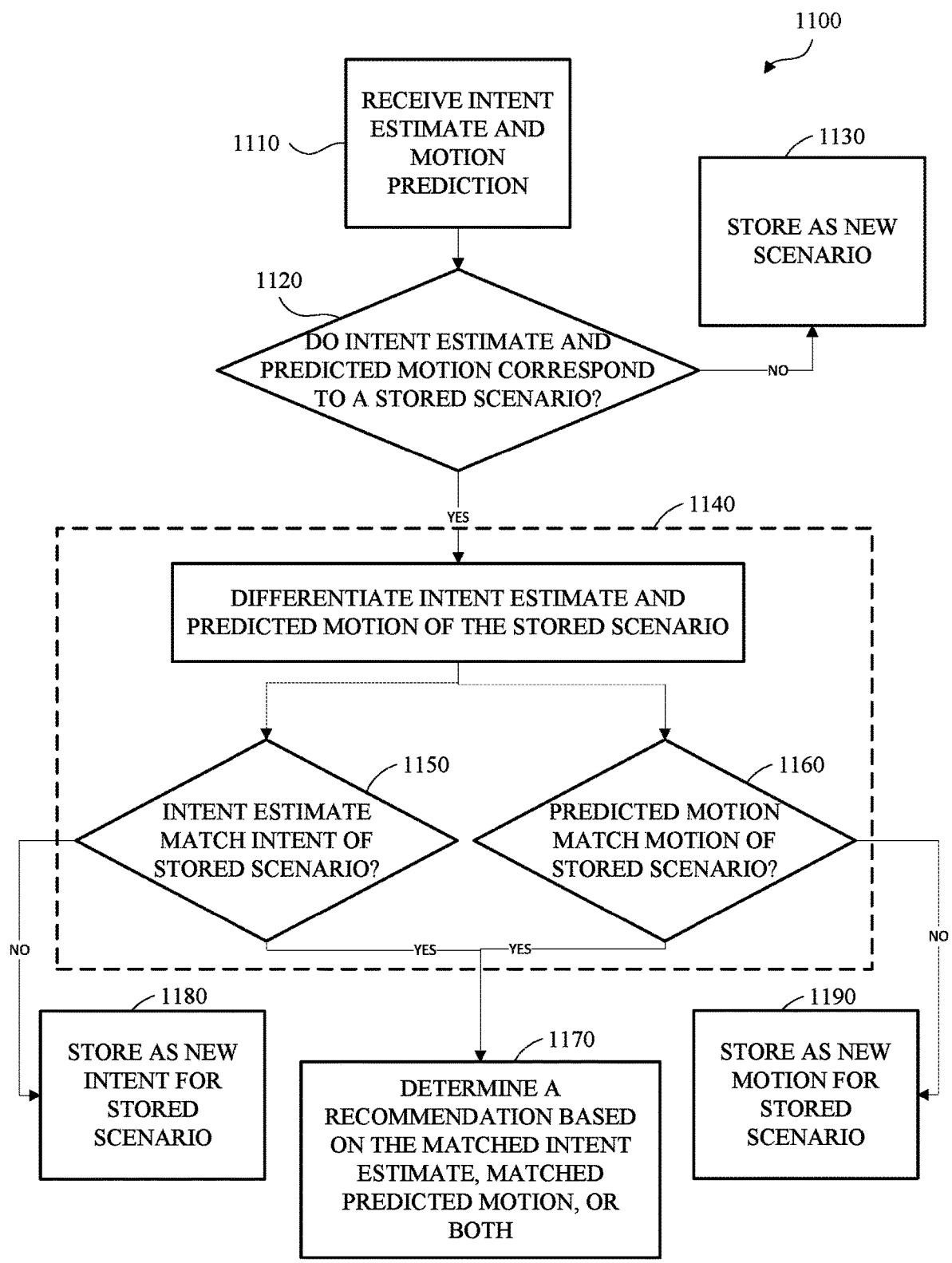
FIG. 11 is a diagram of an example of a method for determining a recommendation based on a combination of two or more models.

FIG. 11 is a diagram of an example of a method 1100 for determining a recommendation based on a combination of two or more models. Referring to FIG. 11, a function approximator may receive 1110 an intent estimate and a motion prediction. The function approximator may then determine 1120 whether the intent estimate and the predicted motion correspond to a stored scenario. If the intent estimate and the predicted motion do not correspond to a stored scenario, the function approximator may store 1130 the observed scenario as a new scenario, for example in memory unit 3040 or memory unit 3050 shown in FIG. 3. If the intent estimate and the predicted motion correspond to a stored scenario, the function approximator differentiates 1140 the intent estimate and the predicted motion of the stored scenario. Differentiating the intent estimate and the predicted motion of the stored scenario may include determining 1150 whether the intent estimate matches the intent of the stored scenario. Differentiating the intent estimate and the predicted motion of the stored scenario may include determining 1160 whether the predicted motion matches the motion of the stored scenario.

If the intent estimate is determined to match the intent of the stored scenario, the function approximator may determine 1170 a recommendation based on the matched intent estimate. If the intent estimate is determined not to match the intent of the stored scenario, the function approximator may be configured to store 1180 the intent estimate as a new intent for the stored scenario, for example in memory unit 3040 or memory unit 3050 shown in FIG. 3.

If the predicted motion is determined to match the intent of the stored scenario, the function approximator may determine 1170 a recommendation based on the matched motion. If the predicted motion is determined not to match the motion of the stored scenario, the function approximator may be configured to store 1190 the predicted motion as a new motion for the stored scenario, for example in memory unit 3040 or memory unit 3050 shown in FIG. 3.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A vehicle control system for an autonomous vehicle (AV), the vehicle control system comprising:
    a perception unit; and
    a behavioral planning unit comprising:
        an intent estimator configured to receive a first set of perception information from the perception unit;
        a motion predictor configured to receive the first set of perception information from the perception unit;
        a function approximator configured to receive a second set of perception information from the perception unit, wherein the second set of perception information is smaller than the first set of perception information, wherein the function approximator is further configured to determine whether an output of the motion predictor is correct, and on a condition that the function approximator determines that the output of the motion predictor is not correct, the function approximator is further configured to discredit the motion predictor, the function approximator further configured to determine a prediction; and
        a control unit configured to use the prediction to control an operation of the AV.

2. The vehicle control unit of claim 1, wherein the behavioral planning unit is configured to concurrently combine an output of the intent estimator and an output of the motion predictor.

3. The vehicle control unit of claim 2, wherein the behavioral planning unit is configured to concurrently combine the output of the intent estimator and the output of the motion predictor using a voting method.

4. The vehicle control unit of claim 2, wherein the behavioral planning unit is configured to concurrently combine the output of the intent estimator and the output of the motion predictor using algebraic multiplication.

5. The vehicle control unit of claim 1, wherein the function approximator is further configured to determine whether an output of the intent estimator is correct, and on a condition that the function approximator determines that the output of the intent estimator is not correct, the function approximator is further configured to discredit the intent estimator.

6. The vehicle control unit of claim 1, wherein the second set of perception information is a learned set of correlations or derivations.

7. The vehicle control unit of claim 1, wherein the function approximator is further configured to determine a context of an observed scene based on the second set of perception information.

8. The vehicle control unit of claim 1, wherein the function approximator is configured to combine an output of the intent estimator, an output of the motion predictor, and the second set of perception information.

9. The vehicle control unit of claim 8, wherein the function approximator is configured to determine the prediction based on the combination of the output of the intent estimator, the output of the motion predictor, and the second set of perception information.

10. A method for use in an autonomous vehicle (AV), the method comprising:
    receiving a first set of perception information at an intent estimator;
    receiving the first set of perception information at a motion predictor;

receiving a second set of perception information at a function approximator, wherein the second set of perception information is smaller than the first set of perception information;

determining whether an output of the motion predictor is correct; and on a condition that the output of the motion predictor is not correct, discrediting the motion predictor determining a prediction; and controlling an operation of the AV based on the prediction.

11. The method of claim 10 further comprising:
concurrently combining an output of the intent estimator and an output of the motion predictor.

12. The method of claim 11, wherein the combining is performed using a voting method.

13. The method of claim 11, wherein the combining is performed using algebraic multiplication.

14. The method of claim 10 further comprising:
determining whether an output of the intent estimator is correct; and
on a condition that the output of the intent estimator is not correct, discrediting the intent estimator.

15. The method of claim 10, wherein the second set of perception information is a learned set of correlations or derivations.

16. The method of claim 10 further comprising:
determining a context of an observed scene based on the second set of perception information.

17. The method of claim 10 further comprising:
combining an output of the intent estimator, an output of the motion predictor, and the second set of perception information.

18. The method of claim 17 further comprising:
determining the prediction based on the combination of the output of the intent estimator, the output of the motion predictor, and the second set of perception information.

* * * * *